(12) United States Patent
Stauffer et al.

(10) Patent No.: US 6,179,567 B1
(45) Date of Patent: Jan. 30, 2001

(54) TURBOMACHINERY BLADE OR VANE WITH A SURVIVABLE MACHINING DATUM

(75) Inventors: Bruce A. Stauffer, Scotland; Gilbert B. Wilcox, Somers, both of CT (US)

(73) Assignee: United Technologies Corporation, Hartford, CT (US)

(*) Notice: Under 35 U.S.C. 154(b), the term of this patent shall be extended for 0 days.

(21) Appl. No.: 09/376,225

(22) Filed: Aug. 18, 1999

(51) Int. Cl.[7] .................................................. B63H 1/16
(52) U.S. Cl. ............................................................. 416/191
(58) Field of Search ........................... 416/193 A, 196 R, 416/174, 189, 191, 228

(56) References Cited

U.S. PATENT DOCUMENTS

| | | |
|---|---|---|
| 4,576,551 | 3/1986 | Olivier et al. .................. 416/191 |
| 5,288,209 | 2/1994 | Therrien et al. ................ 416/193 R |
| 5,544,873 | 8/1996 | Vickers et al. .................. 269/47 |

*Primary Examiner*—Edward K. Look
*Assistant Examiner*—Hermes Rodriguez
(74) *Attorney, Agent, or Firm*—Kenneth C. Baran

(57) ABSTRACT

A turbine blade (18) for a gas turbine engine includes a machining datum and support tool interface (52). The datum and interface feature is a frustoconical depression residing in a blade outer shroud (36) and ideally aligned with an airfoil stacking line (40). The blade has a prefinished state in which the depression has a prefinished depth and a finished state in which the depression has a finished depth. The finished depth is smaller than the prefinished depth, but is nevertheless sufficient to act as a support feature during manufacturing operations. The utility of the depression, as both a datum and as a support feature, survives the original manufacturing operations so that the depression is useful for post-manufacturing inspection and repair.

9 Claims, 3 Drawing Sheets

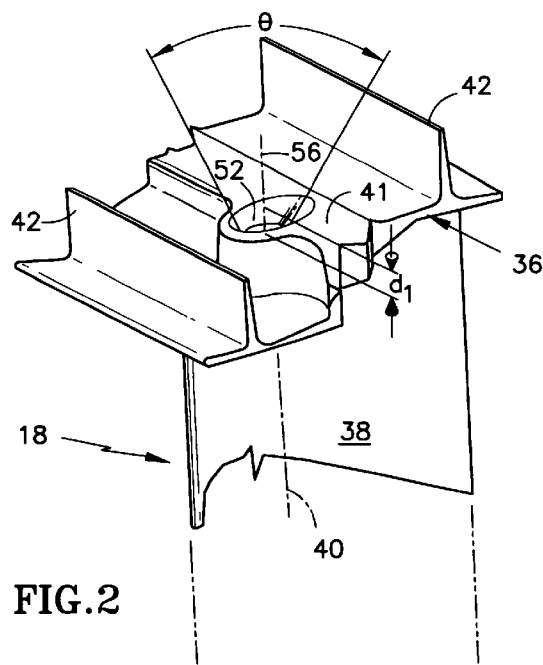
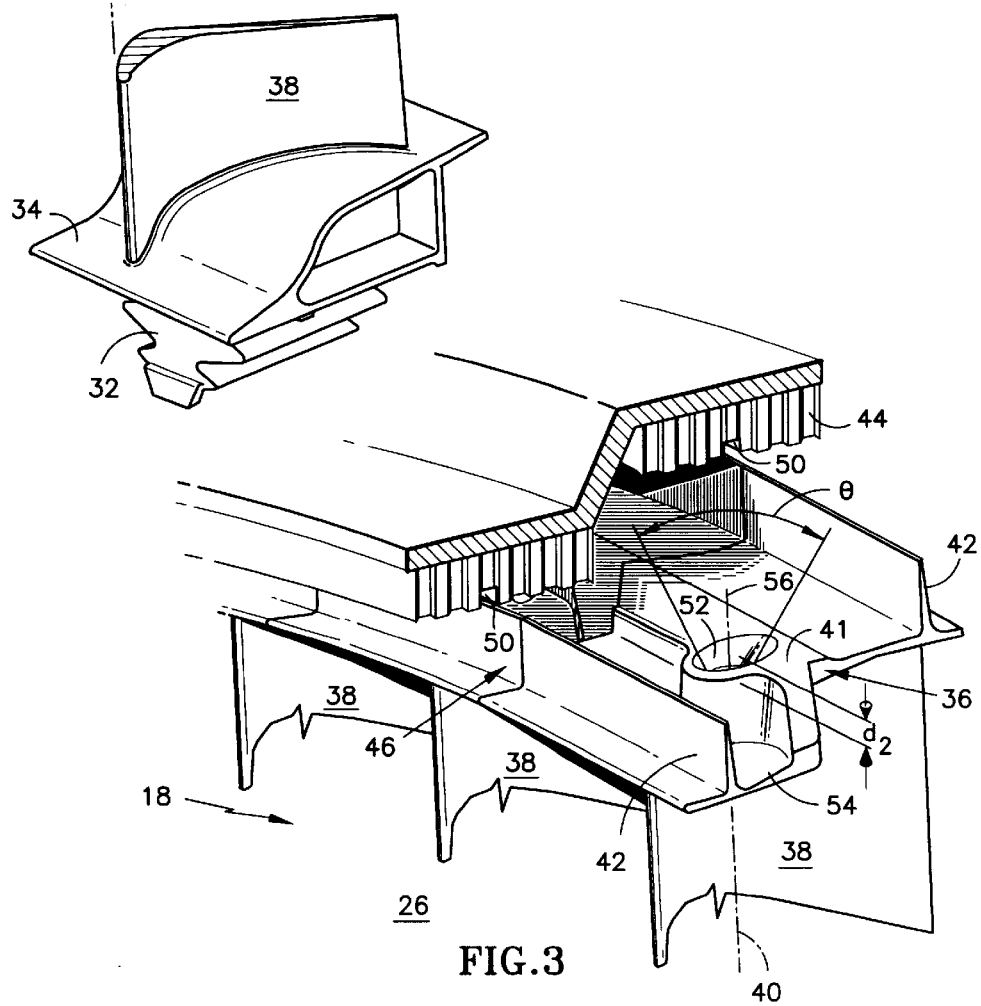
FIG.2
FIG.3

TURBOMACHINERY BLADE OR VANE WITH A SURVIVABLE MACHINING DATUM

CROSS REFERENCE TO RELATED APPLICATIONS

This application includes subject matter related to commonly owned, copending application 08/953,129, filed on Oct. 17, 1997.

TECHNICAL FIELD

This invention relates to turbomachinery blades and vanes and particularly to a blade or vane having a machining datum whose utility survives the original manufacturing process so that the datum is available for use in post-manufacturing inspection and repair operations.

BACKGROUND OF THE INVENTION

Gas turbine engines and similar turbomachines have one or more compressors and turbines. The compressors and turbines include longitudinally alternating arrays of blades and vanes that extend radially across an annular flowpath. During operation of the turbomachine, a working medium fluid flows longitudinally through the flowpath. The blades and vanes interact with the working medium fluid to transfer energy from the compressor to the fluid and from the fluid to the turbine.

A typical turbine blade has a root that adapts the blade to be secured to a rotatable hub so that the blade extends radially outwardly from the hub. The blade also includes a platform adjacent to the root, a shroud radially spaced apart from the platform and an airfoil spanning between the platform and the shroud. The airfoil has an intangible, spanwisely extending stacking line, which is a manufacturing reference for establishing the contour of the airfoil and the spatial relationship of the airfoil relative to the platform and shroud. The blade also has a knife edge that extends outwardly from the radially outer surface of the shroud. When a full complement of blades is secured to the hub of a turbomachine to form a blade array, the blade platforms and shrouds define radially inner and outer boundaries of a flowpath for the working medium fluid, and the airfoils span radially across the flowpath. In addition, the knife edges of the installed blades abut each other to form a substantially circumferentially continuous knife edge ring. The knife edge ring extends radially toward an abradable seal that circumscribes the blade array. Over the course of a brief break-in period early in the life of a newly manufactured turbomachine (or after an engine has is been refurbished with a new abradable seal) mechanical deflections and thermally induced dimensional changes cause the knife edge ring to cut a corresponding knife edge groove into the abradable seal. Thereafter, the engine operates with the knife edge ring protruding snugly into the knife edge groove thereby forming a seal that minimizes the leakage of working medium fluid past the airfoils.

The turbine blades are made from a high strength, temperature tolerant alloy that is cast to a near net shape. The blade casting is then polished to smooth out any minor irregularities in the airfoil surface and to remove any excess material from the airfoil's leading and trailing edges. The blade platform and shroud are then finish machined to render the blade dimensionally and geometrically suitable for installation and service in the turbomachine.

The finish machining of the platform and shroud is conducted according to a highly automated manufacturing protocol known as "one piece flow". This protocol features a sequence of machines arranged in a logistically optimized flow line in a manufacturing facility. Each machine performs one of several required machining steps, and operates on only one blade at a time. Each blade is transferred from machine to machine in the flow line. In order to guard against the accumulation of machining inaccuracies due to these transfers, the blade has a set of dedicated, highly accurate machining datums.

One of the dedicated datums found on conventional blades is a projection that extends radially outwardly from the shroud. The projection has a radially inner portion that is recessed in a pocket in the shroud outer surface and blends into a pocket sidewall so that the radially inner portion of the projection is peripherally noncontinuous. The projection also has a radially outer portion that extends radially beyond the sidewall and therefore is peripherally continuous. The peripherally continuous outer portion serves not only as a reference point but also as one of a number of interfaces by means of which the blade can be predictably positioned and anchored in place in each of the one piece flow machines.

If such a blade were to be installed in a turbomachine, the outer portion of the projection would cut into the seal that circumscribes the blade array in much the same way that the knife edge ring cuts into the seal. Because the knife edge ring and the projection are separated by only a small distance, and because the hub shifts slightly in the longitudinal direction during engine operation, the cut made by the projection can merge with and expand the width of the knife edge groove. As a result the desired snug fit between the knife edge ring and the knife edge groove is undermined thereby diminishing the effectiveness of the seal and reducing the turbomachine's efficiency. To guard against this occurrence, the outer portion of the projection is machined off, leaving behind only the inner portion, which is too short to contact the seal. The removal of the outer portion also destroys the projection's utility as a datum, and therefore the outer portion is not removed until all the other machining operations are complete and the projection is no longer necessary to facilitate blade manufacture.

Turbine blades, such as those just described, must also undergo post-manufacturing dimensional inspections. The above described machining projection would be an ideal inspection reference point. However since the projection is not available as a reference in the post-manufacturing environment, it is common practice to rely on alternative reference points. These alternative references are two sets of datum triplets on the airfoil, one set near the platform and one near the shroud. These datum triplets are far less accurate than the machining projection, and therefore overly stringent inspection criteria must be established to ensure that all dimensionally unacceptable blades are identified. As a result, some blades that are dimensionally acceptable will be identified as unacceptable, and will be scrapped. Given the high cost of turbomachinery blades it is clearly desirable to minimize the likelihood that a serviceable blade is erroneously identified as unacceptable.

A similar difficulty arises when damaged or deteriorated blades are refurbished to extend their serviceability. The absence of the machining projection forces reliance upon less accurate datums, and as a result it may not be possible to realize the full potential of the refurbishment.

One way to ensure that the projection's utility survives the original manufacturing process is described in commonly owned, copending U.S. patent application 08/953129, entitled "Turbomachinery Blade or Vane with a Permanent Machining Datum", filed on Oct. 17, 1997. The '129 application discloses a turbine blade having a conical datum projecting from a pocket in the blade shroud and spaced a distance s from the pocket sidewall. Because of the spacing, the peripheral continuity of the projection survives the finish machining operations so that the projection retains its utility as a reference and anchoring feature. Because the projection is partially recessed within the pocket, it is partially protected from damage due to careless handling. In addition, the axis of the projecting datum is aligned with (i.e. coincides with) the airfoil stacking line to simplify manufacturing tooling requirements.

The survivable datum disclosed in the above noted patent application is superior to a nonsurvivable datum, but is not without certain shortcomings. Although much of the projection is recessed within a pocket, the tip of the projection is exposed and therefore vulnerable to possible handling damage. Moreover, in the disclosed blade, the highly desirable alignment of the datum axis with the stacking line is obtained by introducing a scallop into the pocket sidewall. In blades that require a generous scallop, the presence of the scallop can degrade the stiffness of the shroud, making it susceptible to undesirable, centrifugally induced deflections during engine operation. Although a generous scallop could be avoided by repositioning the datum elsewhere on the shroud, such repositioning would separate the datum axis from the stacking line, thereby complicating the tooling required for blade manufacture.

SUMMARY OF THE INVENTION

It is, therefore, an object of the invention to provide a turbine blade or vane with a survivable machining datum so that post manufacturing inspection and refurbishment can be carried out with the degree of accuracy and confidence enjoyed during the original manufacturing process.

It is another object of the invention to make the survivable datum substantially immune to handling damage. It is still another object of the invention to provide a machining datum that can be aligned with the airfoil stacking line without appreciably compromising shroud stiffness or other mechanical properties of the blade.

According to the invention, a turbomachinery blade or vane, generically referred to herein as fluid reaction elements, has a depression that serves as a datum and as an interface for anchoring the blade or vane during manufacturing operations. The depression has a prefinished depth and a smaller finished depth. Both the prefinished and finished depths are sufficient to act as a support feature during manufacturing operations.

According to one aspect of the invention, the datum has a substantially frustoconical profile in both the prefinished and finished states. According to another aspect of the invention, the profile is defined by a cone angle favorable for both the casting and finishing phases of blade manufacture.

In one detailed embodiment of the invention, a turbomachinery blade comprises a platform, a shroud, an airfoil extending therebetween, and a depressed, frustoconical machining datum residing in the shroud. The blade has a prefinished state in which the datum has a prefinished depth and a finished state in which the datum has a finished depth. The finished depth is smaller than the prefinished depth but is nevertheless capable of acting as both a reference and support feature during post manufacture inspection and refurbishment.

The invention is advantageous in several respects. First, the utility of the depression transcends the manufacturing process so that post-manufacturing inspection and repair procedures can be carried out with the same degree of accuracy as the original manufacturing operations. As a result, blade scrap rates can be reduced and the full potential of refurbishment operations can be realized. Second, the non-projecting character of the datum makes it inherently immune to handling damage. Finally, it may often be possible to align the datum with the airfoil stacking line without undermining is the utility of other features on the blade, such as the above noted stiffening properties of the shroud sidewall. Accordingly, the blade designer need not compromise the mechanical properties of the blade to achieve tooling simplicity or vice versa.

The foregoing features and advantages and the operation of the invention will become more apparent in light of the following description of the best mode for carrying out the invention and the accompanying drawings.

BRIEF DESCRIPTION OF THE DRAWINGS

FIG. 2 is a perspective view of a turbine blade according to the present invention shown in a prefinished state and illustrating a depression that serves as a reference datum and support interface during manufacturing operations.

FIG. 3 is a view similar to that of FIG. 2 showing the radially outer end of the blade in its finished state, the blade being illustrated in relation to other blades of a turbine blade array and in relation to an abradable seal that circumscribes the array.

BEST MODE FOR CARRYING OUT THE INVENTION

Figure 1:
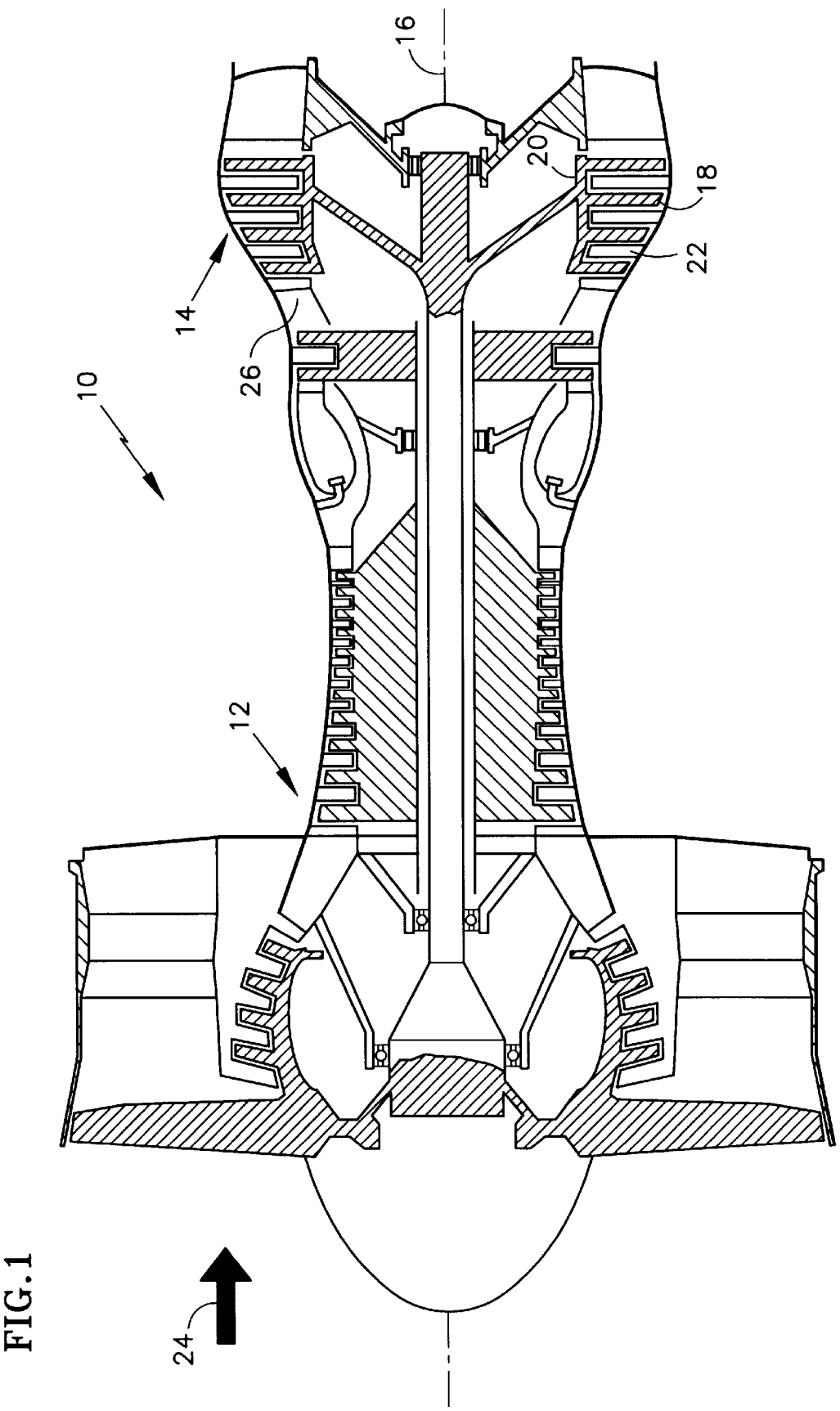
FIG. 1 is a schematic side view of a turbofan gas turbine engine.

Referring to FIG. 1, a turbomachine, exemplified by gas turbine engine 10 includes one or more compressors 12, and one or more turbines 14 disposed about a longitudinally extending central axis 16. The compressors and turbines include one or more arrays of blades, such as low pressure turbine blade 18, extending radially outwardly from a rotatable hub 20, and one or more arrays of nonrotatable, radially extending vanes such as turbine vane 22. During engine operation, a working medium fluid 24 flows longitudinally through an annular flowpath 26 and interacts with the blades and vanes to exchange energy with the compressors and turbines.

Figure 4:
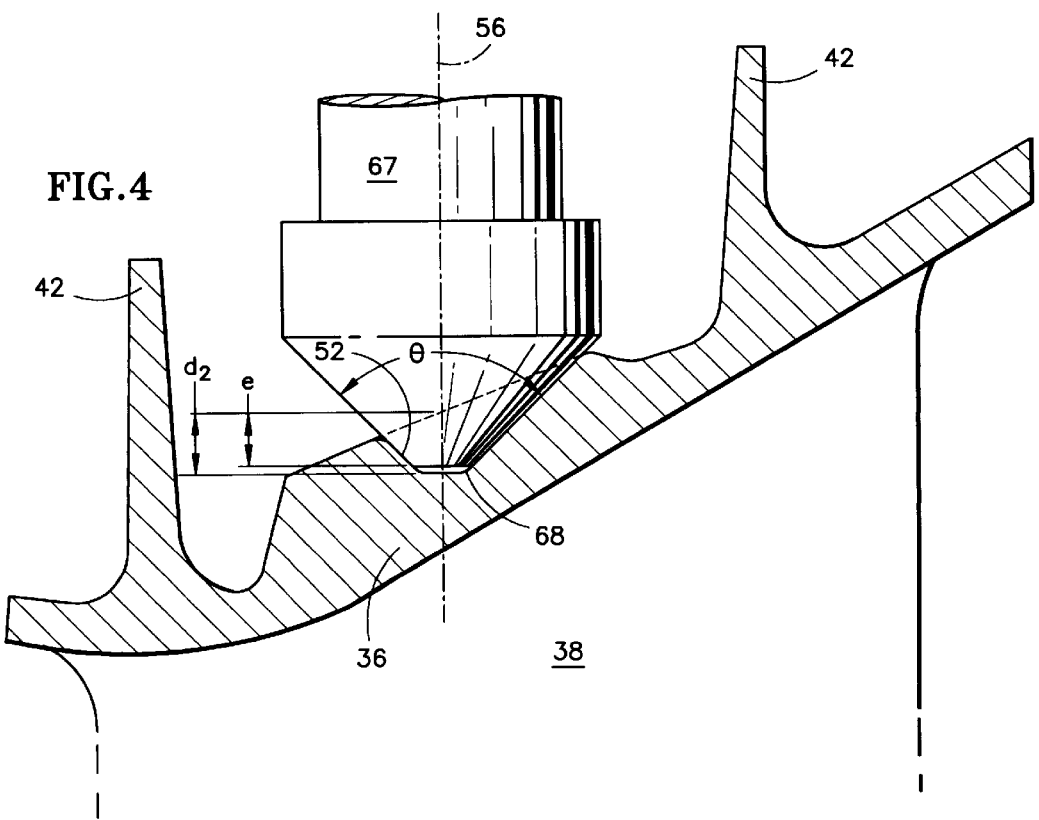
FIG. 4 is a side view of the blade of FIG. 3 showing an exemplary depression in greater detail and also showing a fixturing tool engaging the depression.

FIGS. 2, 3 and 4 show turbine blade 18 in greater detail. FIG. 2 shows the blade in its prefinished state, i.e. prior to finish machining operations that render the blade geometrically and dimensionally suitable for installation in an engine. FIGS. 3 and 4 show the blade in its finished state. The blade 18 includes a root 32, a platform 34 adjacent to the root, a shroud 36 and an airfoil 38 spanning between the root and the shroud. The shroud and platform of each blade cooperate with the shrouds and platforms of the other blades in the array to define the outer and inner boundaries of the flowpath. An intangible, spanwisely extending stacking line 40 serves as a reference for establishing the airfoil's contour as well as its spatial relationship to the platform and shroud. The blade shroud 36 includes a thick stiffening rail 41.

During engine operation the rail helps to resist excessive shroud curling, which is an undesirable, centrifugally induced deflection of the shroud. The blade shroud also includes a pair of knife edges 42, each of which extends radially outwardly toward an abradable seal 44 (FIG. 3) that circumscribes the blade array. Each knife edge also extends circumferentially and abuts the knife edges of the adjacent blades in the array to form a substantially continuous, circumferentially extending knife edge ring 46. When the engine is initially assembled, the knife edge ring does not contact the seal. However during a brief break-in period when the engine is first operated at high power, mechanical deflections and thermally induced dimensional changes cause each knife edge ring to cut a knife edge groove 50 into the seal. Thereafter, the ring protrudes into the groove during high power operation to form a barrier against the leakage of working medium fluid past the airfoils.

The blade also includes a depression 52 that resides in the outer face of the shroud and serves as both a machining datum and as an interface for a support tool 67 (FIG. 4) to anchor the blade during machining operations. In the prefinished state (FIG. 2) the depression has prefinished depth $d_1$ and a substantially frustoconical profile defined by a cone angle $\theta$. The prefinished depth is deep enough and the cone angle is small enough that the depression can serve as a reliable support feature during machining operations. The datum is symmetric about a cone axis 56 and is positioned so that the axis 56 is substantially aligned with (i.e. collinear with) the stacking line 40. When the blade is installed in an engine, the datum axis and stacking line are oriented radially.

The selected magnitude of cone angle $\theta$ is influenced by both machining and casting considerations. From a casting standpoint, larger cone angles are preferred because larger cone angles are easier to cast into the blade shroud, and smaller angles are harder to cast. However if the angle is too large, machining forces transverse to the cone axis can dislodge the blade from the support tool 67. A smaller cone angle provides more reliable support. But if the cone angle is too small, proper engagement of the support tool with the depression can be compromised by imprecisions in the diameter of the depression. Ideally, the tool engagement depth e (FIG. 4) should be slightly less than the depth of the depression ($d_2$ in FIG. 4) limited only by the fillet radius 68 at the inner end of the depression. But if the cone angle is too small (steep) a small deviation in the diameter of the depression can significantly affect tool engagement depth, thereby defeating the highly reliable support that the smaller cone angle would ordinarily provide. For example a slightly undersized diameter at a small (steep) cone angle can severely limit the tool engagement depth. Conversely, a slightly oversized diameter can allow the tool to contact the bottom of the depression before the peripheral surface of the tool contacts the surface of the depression. The illustrated blade has a cone angle $\theta$ of 90° for ease of casting even though a smaller, 60° cone angle is preferred from a machining standpoint.

In the fully finished state (FIGS. 3, 4) the blade has been machined so that it is geometrically and dimensionally suitable for service in an engine. The final machining operation shaves material off the stiffening rail 41 and therefore decreases the depth of the depression 52 from its prefinished depth $d_1$ to a finished depth $d_2$. The geometry of the depression, e.g. its cone angle, symmetry about axis 56 and alignment with stacking line 40, is otherwise unaffected. Despite the reduction in depth, the depression remains deep enough that the tool engagement distance e still exceeds a predetermined distance. The predetermined distance is sufficiently large to reliably anchor the blade against the forces applied during finish machining operations. Because the datum retains its utility as both a reference point and as a support feature, post manufacturing inspections and repairs can also benefit from its presence.

Figure 5:
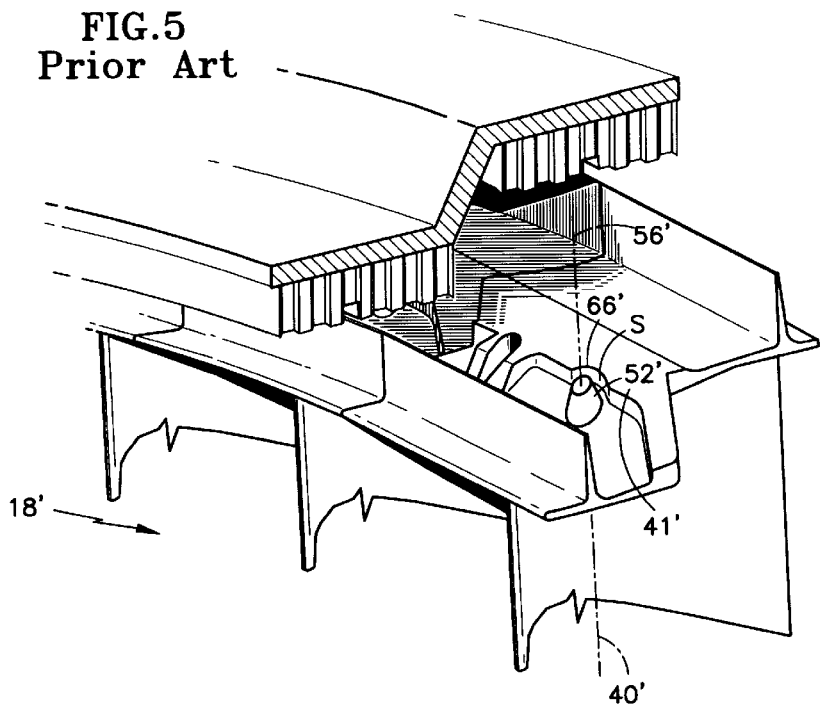
FIG. 5 is a perspective view of a turbine blade with a survivable machining projection, the blade being shown in a prefinished state.

The invention can be better appreciated in comparison with a blade 18' described in the above noted patent application and shown in its finished state in FIG. 5. The blade has a projecting datum 52' whose axis 56' is aligned with the airfoil stacking line 40'. The post-manufacture utility of the datum has been ensured, in part, by introducing a scallop 66' into stiffening rail 41' so that in the finished state the datum is both peripherally continuous and coincident with the stacking line 40'. However, the projecting character of the datum renders it somewhat susceptible to handling damage, whereas the depressed datum 52 of the inventive blade is substantially immune to damage. Moreover, scallop 66' of the earlier generation blade can compromise the stiffness of stiffening rail 41', especially if the scallop is generous. By contrast, the depression 52 of the inventive blade is less detrimental to the stiffness of the rail 41.

The alignment of datum axis 56 with the stacking line 40 and the symmetry of the datum about axis 56 are also beneficial. Alignment of the datum axis and the stacking line is desirable because the angular orientation of the blade is not the same in each of the machines of the one piece flow line. If the datum were not aligned with the stacking line, the spatial position of the stacking line and other physical features on the blade would be orientation dependent, which would complicate the fixturing tools for each machine in the one piece flow line—i.e. each machine's fixturing tools would have to be customized to account for the lack of alignment. However, because the datum axis coincides with the stacking line, the spatial position of the airfoil features is independent of the blade's angular orientation, thereby simplifying the tooling. Symmetry of the datum about the datum axis also simplifies the tooling which would have to be customized if the datum were asymmetrical.

The invention is not limited to the above described embodiment. For example, although the invention has been described with reference to a turbine blade, it can be readily applied to any turbomachinery vane or blade. Moreover the datum profile need not be frustoconical, but may be of any useful shape. These and other changes, modifications and adaptations can be made without departing from the invention as set forth in the accompanying claims.

We claim:

1. A fluid reaction element for a turbomachine, the fluid reaction element having a depression serving as a datum and as an interface for supporting the fluid reaction element during manufacturing operations, the fluid reaction element having a prefinished state in which the depression has a prefinished depth, and a finished state in which the depression has a finished depth smaller than the prefinished depth, both the prefinished depth and the finished depth being sufficient for the depression to act as a support feature during machining operations.

2. The fluid reaction element of claim 1 wherein the depression has a substantially frustoconical profile in both the finished state and the prefinished state.

3. The fluid reaction element of claim 2 wherein the frustoconical profile is defined by a cone angle of between about 60 degrees and 90 degrees.

4. The fluid reaction element of claim 1 wherein the fluid reaction element is a blade.

5. The fluid reaction element of claim 1 wherein the fluid reaction element is a blade adapted to be secured to a hub so that the blade extends radially outwardly from the hub, the blade comprising a platform for defining a segment of the radially inner boundary of an annular working medium flowpath, a shroud for defining a segment of the radially outer boundary of the flowpath, and an airfoil extending between the platform and the shroud, and wherein the depression resides in the shroud.

6. The fluid reaction element of claim 5 wherein the airfoil has a radially extending stacking line and the depression is symmetric about an axis substantially aligned with the stacking line.

7. A turbomachinery blade adapted to be secured to a hub so that the blade extends radially outwardly from the hub, the blade comprising a platform for bounding a segment of the radially inner boundary of an annular working medium flowpath, a shroud for bounding a segment of the radially outer boundary of the flowpath, an airfoil extending between the platform and the shroud, and a depression residing in the shroud, the blade having a prefinished state in which the depression has a prefinished depth, and a finished state in which the depression has a finished depth smaller than the prefinished depth, both the prefinished depth and the finished depth being sufficient for the depression to act as a support feature during machining operations.

8. The turbomachinery blade of claim 7 wherein the depression has a substantially frustoconical profile in both the finished state and the prefinished state.

9. The turbomachinery blade of claim 7 wherein the airfoil has a radially extending stacking line and the depression is symmetric about an axis substantially aligned with the stacking line.

* * * * *